United States Patent [19]
Sin et al.

[11] Patent Number: 5,687,611
[45] Date of Patent: Nov. 18, 1997

[54] PARKING BRAKE FOR USE WITH A POWER SHIFT TRANSMISSION

[75] Inventors: Sang Ho Sin; Ki Sup Yoon, both of Incheon, Rep. of Korea

[73] Assignee: Daewoo Heavy Industries Ltd., Incheon, Rep. of Korea

[21] Appl. No.: 579,690

[22] Filed: Dec. 28, 1995

[30] Foreign Application Priority Data

Dec. 29, 1994 [KR] Rep. of Korea .................. 94-38863

[51] Int. Cl.⁶ .................. B60K 41/26; F16D 67/02
[52] U.S. Cl. .................. 74/411.5; 192/4 A; 192/17 R
[58] Field of Search .................. 192/4 A, 4 C, 192/17 R; 74/411.5, 414, 325, 331, 337.5; 188/77 R

[56] References Cited

U.S. PATENT DOCUMENTS

| | | | |
|---|---|---|---|
| 2,167,171 | 7/1939 | Dodge | 188/77 R |
| 2,990,728 | 7/1961 | Grenier | 192/4 C |
| 3,116,817 | 1/1964 | Quick et al. | 192/4 C |
| 3,216,541 | 11/1965 | Steffen | 192/4 C X |
| 3,348,644 | 10/1967 | Hilpert | 192/4 C X |
| 3,441,114 | 4/1969 | Pensa | 74/411.5 X |
| 4,594,906 | 6/1986 | Vincent et al. | 192/17 R X |
| 5,086,895 | 2/1992 | Nemoto | 192/4 A |

*Primary Examiner*—Rodney H. Bonck
*Attorney, Agent, or Firm*—Lowe, Price, LeBlanc & Becker

[57] ABSTRACT

A parking brake is incorporated in a power shift transmission having an input assembly, an idle assembly and an output assembly housed within a transmission housing, the input assembly provided with an input shaft, an input gear fixedly secured to the input shaft for rotation therewith in unison and an output gear selectively couplable to the input gear. The parking brake includes a brake drum extending from the output gear toward the input gear in a coaxial relationship with the input shaft and having a cylindrical outer circumference. A brake band is wrapped around the outer circumference of the brake drum and has a stationary end secured to the transmission housing and a movable end displaceable with respect to the stationary end. A band actuator is operatively associated with the movable end of the brake band for selectively tightening the brake band into frictional contact with the brake drum and loosening the brake band out of contact with the brake drum. As an alternative, the brake drum may be provided on an output shaft of the idle assembly rather than the input assembly.

6 Claims, 5 Drawing Sheets

5,687,611

PARKING BRAKE FOR USE WITH A POWER SHIFT TRANSMISSION

FIELD OF THE INVENTION

The present invention pertains to a parking brake and, more specifically, to a parking brake for use with a power shift transmission of, for instance, a forklift track, manually operated by the driver to produce a braking force when the forklift truck is to be parked.

DESCRIPTION OF THE PRIOR ART

As ordinary artisans am aware, the forklift truck has been extensibly employed for the load shipping purpose or for the transportation of heavyweight articles from one place to another, usually within a limited working area. Characterized by dual forks capable of up-and-down movement along a mast, the forklift truck has a turning ability and maneuverability excellent enough to carry out the assigned tasks in a highly efficient manner. A power shift transmission is mounted on the forklift truck to perform gear shifting between a forward gear, a reverse gear and a neutral gear by use of fluid pressure. To park the forklift truck immovable with the transmission shifted to the neutral gear, the forklift truck is equipped with a parking brake that can produce a braking force to be applied to an appropriate rotating part of the transmission.

Conventional power shift transmissions typically employed in a forklift track include, as illustrated in FIG. 1, a transmission housing 10 having a fluid passageway 10a formed therethrough and an input assembly 12 rotatably mounted to the transmission housing 10 together with an idle assembly and an output assembly not shown in the drawing for simplicity. The input assembly 12 is provided with an input shaft 14 journalled by bearings 16, 18 on the transmission housing 10 for rotation with a travel motor or engine, which input shaft 14 in mm has a fluid communication hole 14a leading to the fluid passageway 10a of the transmission housing 10 and an input gear 20 integrally formed therewith. At a location spaced apart from the input gear 20, an output gear 22 is rotatably fitted on the input shaft 14 with a bearing 24 interposed therebetween. The input gear 20 has a large diameter cylinder 20a, on the inner circumference of which are axially displaceably held a plurality of input clutch disks 20b. Similarly, the output gear 22 has a small diameter cylinder 22a, on the outer circumference of which are axially movably attached a plurality of output clutch disks 22b in an interleaving relationship with the input clutch disks 20b. Extendibly fitted between the input shaft 14 and the cylinder 20a of the input gear 20 is a clutch piston 24 which should be normally biased against the input gear 20 by a compression spring 26, allowing the input and output clutch disks 20b, 22b to be disengaged with each other.

When a working fluid under pressure is fed to the backside of the clutch piston 24 through the fluid communication hole 14a, the clutch piston 24 will be extended against the compression spring 26 to press the input and output clutch disks 20b, 22b into engagement with one another. This makes sure that the torque of the input gear 20 be transmitted to the output gear 22 and then the final driven gear (not shown) of the output shaft, causing the forklift truck to move forwardly. On the other hand, if the working fluid is exhausted via the fluid communication hole 14a the clutch piston 24 will be retracted by the biasing force of the compression spring 26, which permits the input and output clutch disks 20b, 22b to be separated from one another, whereby the torque of the input gear 20 can no longer be delivered to the output gear 22. Instead, the torque of the input gear 20 will be transmitted to the output assembly by way of the idle assembly, causing the forklift track to run in a reverse direction.

Stating the parking brake built to the afore-mentioned power shift transmission, a brake gear 28 is adapted to mesh with the input gear 20 in a manner that substantial portion of the brake gear 28 should be exposed to the outside of the transmission housing 10. A brake drum 32 is rigidly connected to the brake gear 28 through a shaft 30 to rotate together with the brake gear 28 in unison. Wound over and around the brake dram 32 is a brake band 34 that, when a parking lever is brought into a parking position by the driver, serves to apply a braking force to the brake drum 32, thereby securing the brake gear 28, the output gear 22 and the final driven gear of the output assembly against rotation to keep the forklift truck immovable.

One major drawback posed by the "outboard" type parking brake is that an extra installation space has to be provided outside the transmission housing to accommodate the brake gear 28, the shaft 30 and the brake drum 32, rendering the overall construction of the forklift truck complicated and bulky. Another shortcoming resides in that the brake gear 28, the shaft 30 and the brake drum 32 are costly to manufacture and fit in place, which may be a major culprit in increasing the price of the forklift truck. Besides, the outboard type parking brake is highly vulnerable to contamination of alien matters and external shocks, requiring frequent maintenance and repair.

SUMMARY OF THE INVENTION

Accordingly, it is an object of the invention to provide a parking brake for use with a power shift transmission which is of simplified construction, less costly to fabricate and shielded from external shocks or alien materials.

In one aspect of the invention, a parking brake for use with a power shift transmission comprises: a brake drum extending from an output gear of an input assembly toward an input gear in a coaxial relationship with an input shaft and having a cylindrical outer circumference; a brake band wrapped around the outer circumference of the brake drum; and band actuator means operatively associated with the brake band for selectively tightening the brake band into frictional contact with the brake drum and loosening the brake band out of contact with the brake dram.

In another aspect of the invention, a parking brake for use with a power shift transmission comprises: a brake drum extending from an output gear of an idle assembly toward an input gear in a coaxial relationship with an idle shaft and having a cylindrical outer circumference; a brake band wrapped around the outer circumference of the brake dram; and band actuator means operatively associated with the broke band for selectively tightening the brake band into frictional contact with the brake dram and loosening the brake band out of contact with the brake drum.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
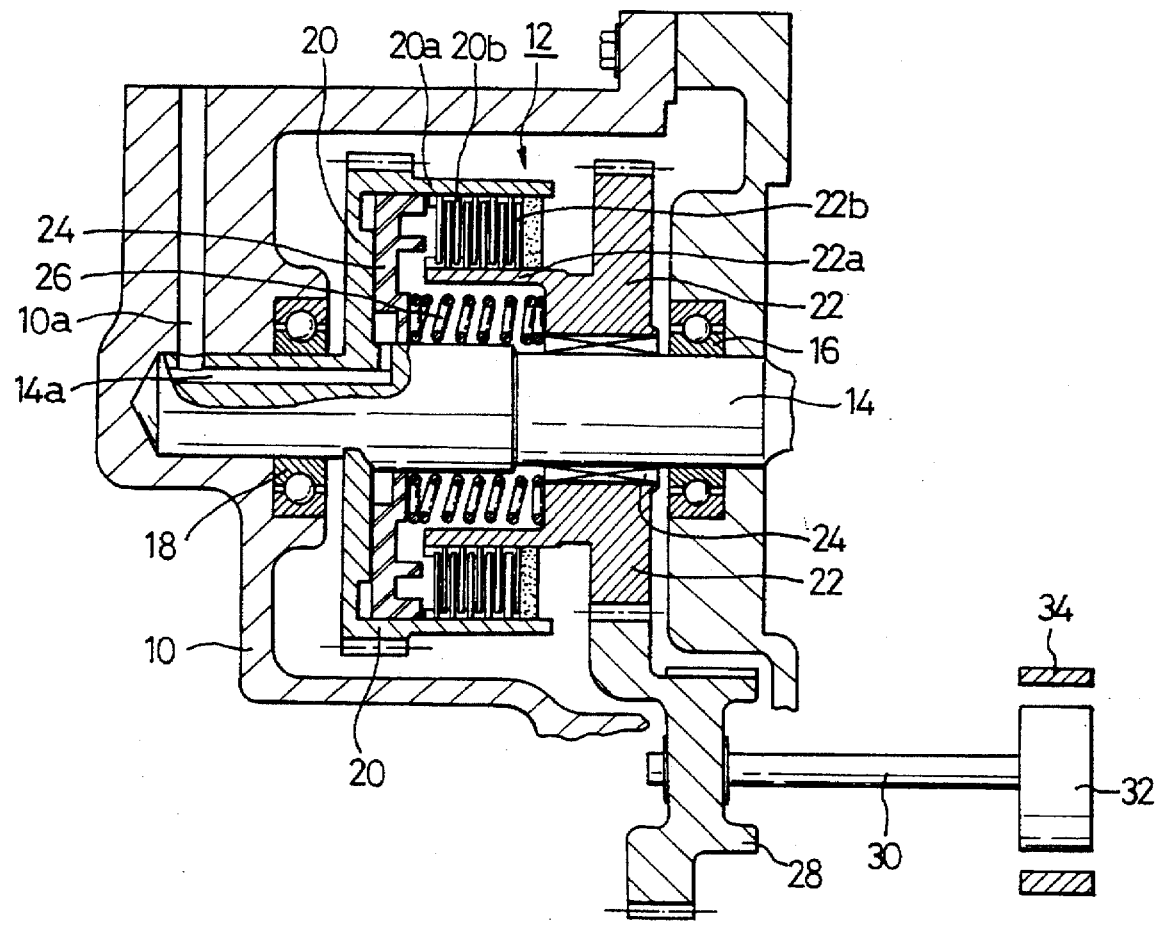
FIG. 1 shows a prior art parking brake installed outside the transmission housing of a power shift transmission for forklift trucks.
Figure 2:
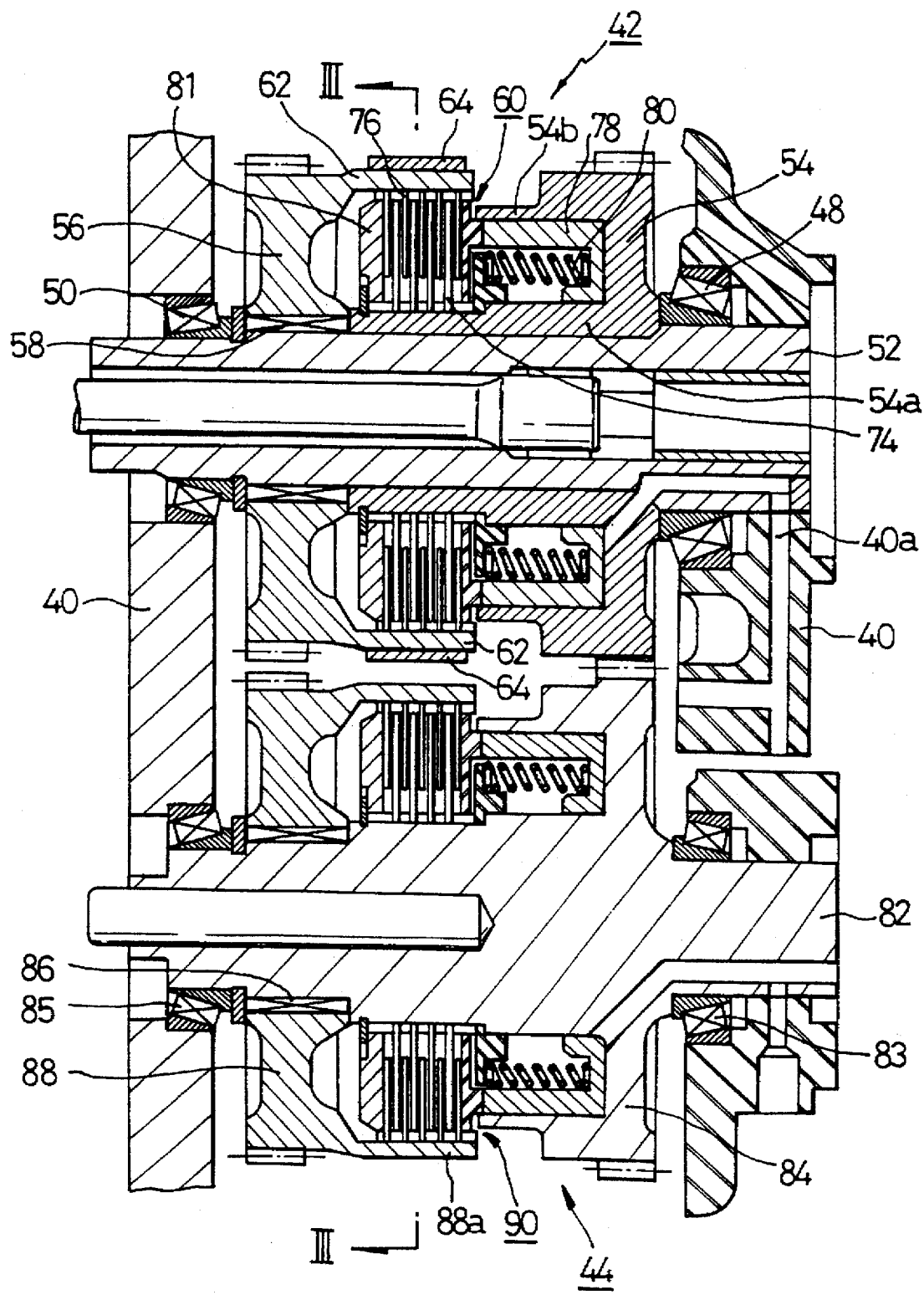
FIG. 2 is a partially cut away, sectional view of a power shift transmission incorporating the parking brake in accordance with shift transmission incorporating the parking brake in accordance with one embodiment of the invention.
Figure 3:
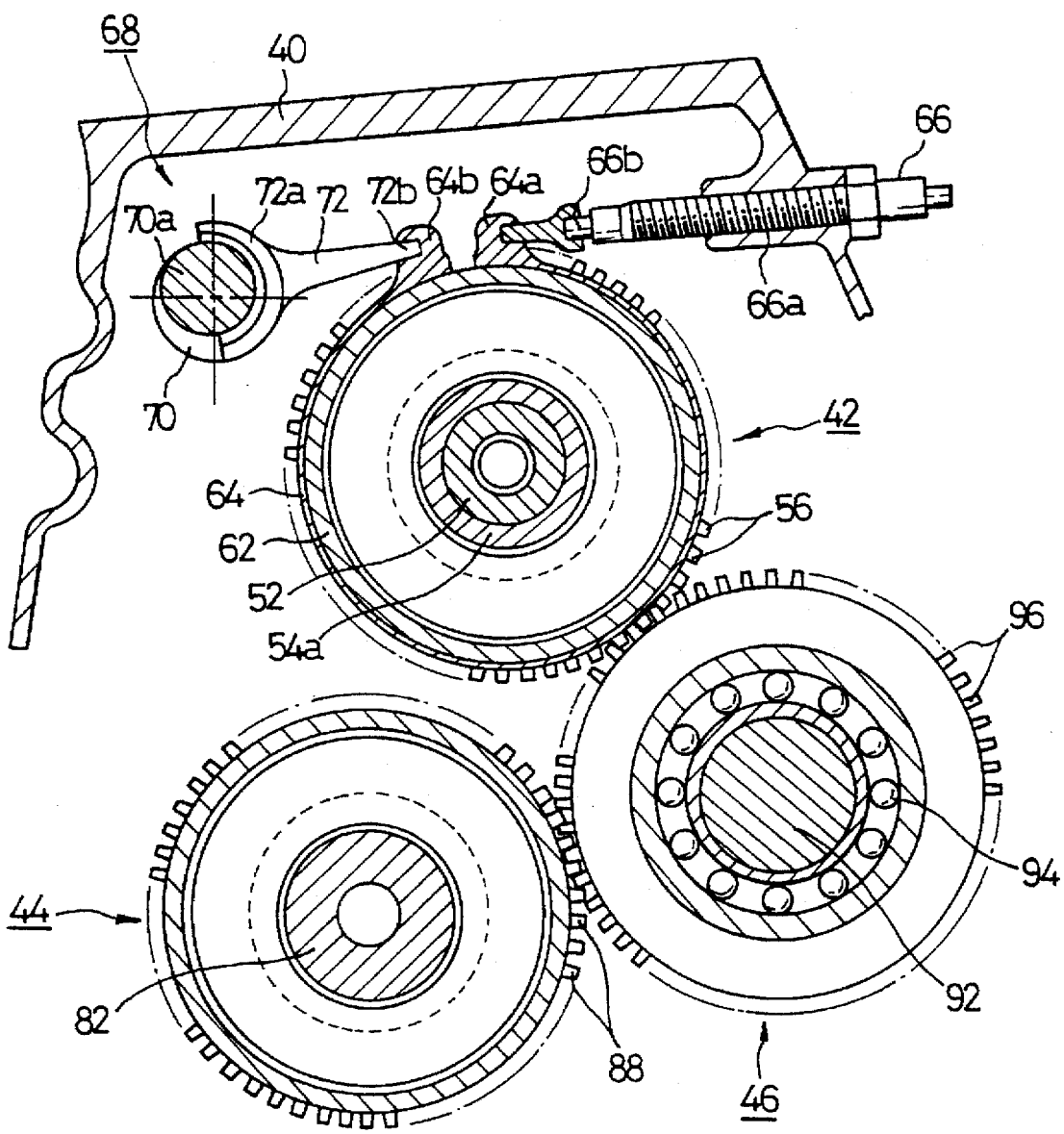
FIG. 3 is a sectional view taken along line 111—111 in FIG. 2.

Referring now to FIGS. 2 and 3, a power shift transmission is shown which incorporates a parking brake in accordance with the first embodiment of the invention. The power shift transmission comprises a transmission housing 40 enclosing therein an input assembly 42, an idle assembly 44 and an output assembly 46. It should be appreciated that the input and idle assemblies 42, 44 are disposed one below the other as best shown in FIG. 2, the output assembly 46 lying in rear of the input and idle assemblies 42, 44 as illustrated only in FIG. 3. The input assembly 42 includes an input shaft 52 rotatably journalled on the transmission housing 40 by virtue of bearings 48, 50 and drivingly connected to a travel motor or prime mover not shown in the drawings for simplicity. An input gear 54 is forcedly fitted to the input shaft 52 for unitary rotation therewith and an output gear 56 is rotatably mounted on the input shaft 52 by means of a bearing 58 in a spaced-apart relationship with respect to the output gear 56. The input assembly 42 further includes a hydraulically operated clutch 60 that can either connect the input and output gears 54, 56 to assure unitary rotation thereof or allow the input and output gears 54, 56 to be disconnected from each other, avoiding any torque delivery therebetween.

The input gear 54 of the input assembly 42 is provided with a hub 54a and a cylindrical wall 54b, both of which extend toward the output gear 56 to define an annular gap between them. The hub 54a has a greater length and a smaller diameter than the cylindrical wall 54b. If desired, the input gear 54 may be integrally formed with the input shaft 52, in which case it becomes possible to omit the hub 54a altogether. The output gear 56 is provided with a brake dram 62 extending toward the input gear 54 in a coaxial alignment with the input shaft 52 and the hub 54a of the input gear 54. The brake drum 62 has a cylindrical outer circumference whose diameter is generally equal to the pitch circle diameter of the output gear 56. Alternatively, the brake drum may be removably attached to the output gear 56 by use of, e.g., a bolt or other suitable fasteners. Wrapped around and over the outer circumference of the brake drum 62 is a brake band 64 that serves to apply a braking force to the brake drum 62 in the event of the forklift truck being parked. As will be apparent in FIG. 3, the brake band 64 has a stationary end 64a fixedly secured to the transmission housing 40 and a movable end 64b displaceable relative to the stationary end 64a. An adjustment bolt 66 may be used to positionchangeably secure the stationary end 64a of the brake band 64 to the transmission housing 40. The adjustment bolt 66 has a middle thread portion 66a threadedly engaged with the transmission housing 40 and a tip portion 66b affixed to the stationary end 64a of the brake band 64. The adjustment bolt 66 can be tightened or loosened to change the exact position of the brake band 64 on the brake drum 62.

Meanwhile, the movable end 64b of the brake band 64 is operatively connected to a band actuator 68 as clearly shown in FIG. 3. The band actuator 68 includes a cam shaft 70 rotatably mounted to the transmission housing 40 in parallel to the input shaft 54, the cam shaft 70 having an eccentric cam 70a whose axis remains offset from an axis of the cam shaft 70, and a connecting rod 72 engaging with the eccentric cam 70a at a first end 72a thereof and fixedly attached to the movable end 64b of the brake band 64 at a second end thereof. Although not shown in the drawings, the cam shaft 70 is associated with a parking lever such that, when the parking lever is manually swung into a parking position by the driver, the cam shaft 70 can rotate clockwise to cause the eccentric cam 70a to push the connecting rod 72 and the movable end 64b of the brake band 64 toward the stationary end 64a.

Referring again to FIG. 2, the hydraulically operated clutch 60 of the input assembly 42 consists of a plurality of input clutch disks 74 axially displaceably carried on the hub 54a of the input gear 54, a plurality of output clutch disks 76 axially slidably attached to the brake drum 62 and alternately disposed between the input clutch disks 74, a clutch piston 78 fluid-tightly fitted between the hub 54a and the cylindrical wall 54b of the input gear 54 for movement between an extended position and a retracted position and a compression spring 80 adapted to normally bias the clutch piston 78 into the retracted position. In addition, a support disk 81 is secured to the free end of the hub 54a of the input gear 54, with a fluid communication passageway 40a provided through the transmission housing 40, the input shaft 52 and the input gear 54 to reach the backside of the clutch piston 78. In case where a fluid under pressure is fed to the clutch piston 78 via the fluid communication passageway 40a, the clutch piston 78 will move toward the output gear 56 into the extended position, whereby the input and output clutch disks 74, 76 are combined together to have the input and output gears 54, 56 rotate as a unit As soon as the fluid is drawn from the fluid communication passageway 40a, the clutch piston 78 will be returned back to the retracted position by the biasing force of the compression spring 80, allowing the input and output clutch disks 74, 76 to be separated form one another and therefore inhibiting any torque delivery from the input gear 54 to the output gear 56 in the input assembly 42.

As can be appreciated in FIGS. 2 and 3, the idle assembly 44, located below the input assembly 4.2, includes an idle shaft 82 rotatably journalled on the transmission housing 40 by means of beatings 83, 85, an input gear 84 integrally formed with the idle shaft 82 and kept in a meshing engagement with the input gear 54 of the input assembly 42, an output gear 88 rotatably fitted to the idle shaft 82 with a bearing 86 interposed therebetween and a hydraulically operated clutch 90 adapted for selectively coupling the input and output gears 84, 88 to enable them to rotate in unison and decoupling the input and output gears 84, 88 to prohibit a torque delivery from the input gear 84 to the output gear 88. It should be noted that the output gear 88 has a dram 88a exending from the peripheral edge of the output gear 88 toward the input gear 84 in a coaxial relationship with the idle shaft 82. Unlike the input gear 54 of the input assembly 42 set forth above, the input gear 84 of the idle assembly 44 has no hub, because it is unitarily formed with the idle shaft 82. The hydraulically operated clutch 90 of the idle assembly 44 has almost the same construction and function as the clutch 60 of the input assembly 42., which will justify omission of a further description in this regard.

As noted in FIG. 3 only, the output assembly 46, positioned in rear of the input and idle assemblies 4.2, 44, includes an output shaft 92 rotatably journalled on the transmission housing 40 by virtue of a bearing 94 and a final driven gear 96 fixedly affixed to the output shaft 92 in a meshing engagement with both the output gear 56 of the input assembly 42 and the output gear 88 of the idle assembly 44. The output shaft 92 of the output assembly 46 is drivingly connected to a drive axle(not shown) of the forklift truck.

Operation of the power shift transmission and the parking brake incorporated therein will now be described with reference to FIGS. 2 and 3. In case of the forklift track being moved forward the input shaft 52 and the input gear 54 in the input assembly 42 is rotatingly driven by a travel motor. As can be understood in FIG. 2, since the input gear 54 is in a meshing engagement with the input gear 84 of the idle assembly 4,1, the idle shaft 82 will be enabled to rotate in the opposite direction to the input shaft 54. If the clutch 60 of the input assembly 42 is activated by a fluid under pressure, the input gear 54 and the output gear 56 in the input assembly 42 will be subjected to a unitary rotational movement. At this time, the clutch 90 of the idle assembly 44 remains deactivated such that the torque of the input gear 84 cannot be delivered to the output gear 88. This will make sure that the final driven gear 96 of the output assembly 46 be mined in the forward direction by the output gear 56 of the input assembly 42, thus enabling the forklift truck to move forward. The output gear 88 of the idle assembly 44 will act as a free-wheeler while the transmission is shifted to the forward gear mode as set forth above.

To establish a reverse gear mode in the power shift transmission, the clutch 60 of the input assembly 54 should be deactivated to avoid a torque delivery between the input gear 54 and the output gear 56, whereas the clutch 90 of the idle assembly 44 is rendered activated to enable unitary rotation of the input gear 84 and the output gear 88 of the idle assembly 44. Accordingly, the final driven gear 96 of the output assembly 46 will be caused to rotate in the reverse direction by the output gear 88 of the idle assembly 44, resulting in a backward movement of the forklift track. At the time when the transmission is in the reverse gear mode, the output gear 56 of the input assembly 42 will become a free-wheeler which should not involve in a torque delivery.

During the period of the forklift track being in a parking position, the input shaft 52 of the input assembly 42 will not be subjected to any rotation, with the clutches 60, 90 of the input and idle assemblies 42, 44 remaining deactivated. In order to deter any unwanted movement of the forklift truck, it becomes necessary to operate the parking brake whereby the output gear 56 of the input assembly 42 can be prohibited from rotation. Pulling up a parking lever will cause the cam shaft 70 to turn clockwise in FIG. 3, which enables the connecting rod 72 to push the movable end 64b of the brake band 64 toward the stationary end 64a. As a result, the brake band 64 will be tightened to apply a braking force over the outer circumference of the brake drum 62. Upon release of the parking lever, the cam shaft 70 will rotate counterclockwise to loosen the brake drum 62.

Figure 4:
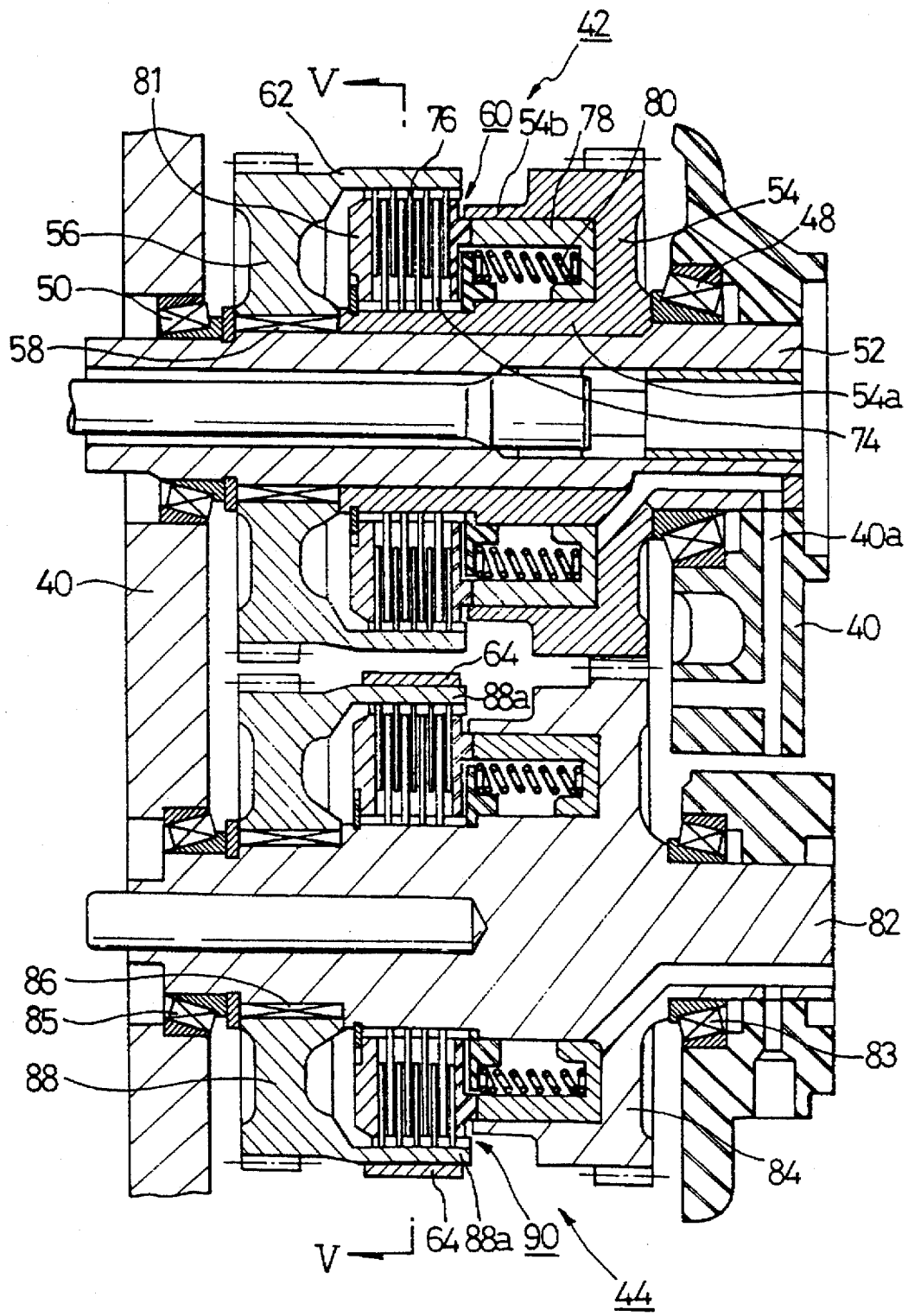
FIG. 4 is a partially cut away, sectional view of a power shift transmission incorporating the parking brake in accordance with another embodiment of the invention.
Figure 5:
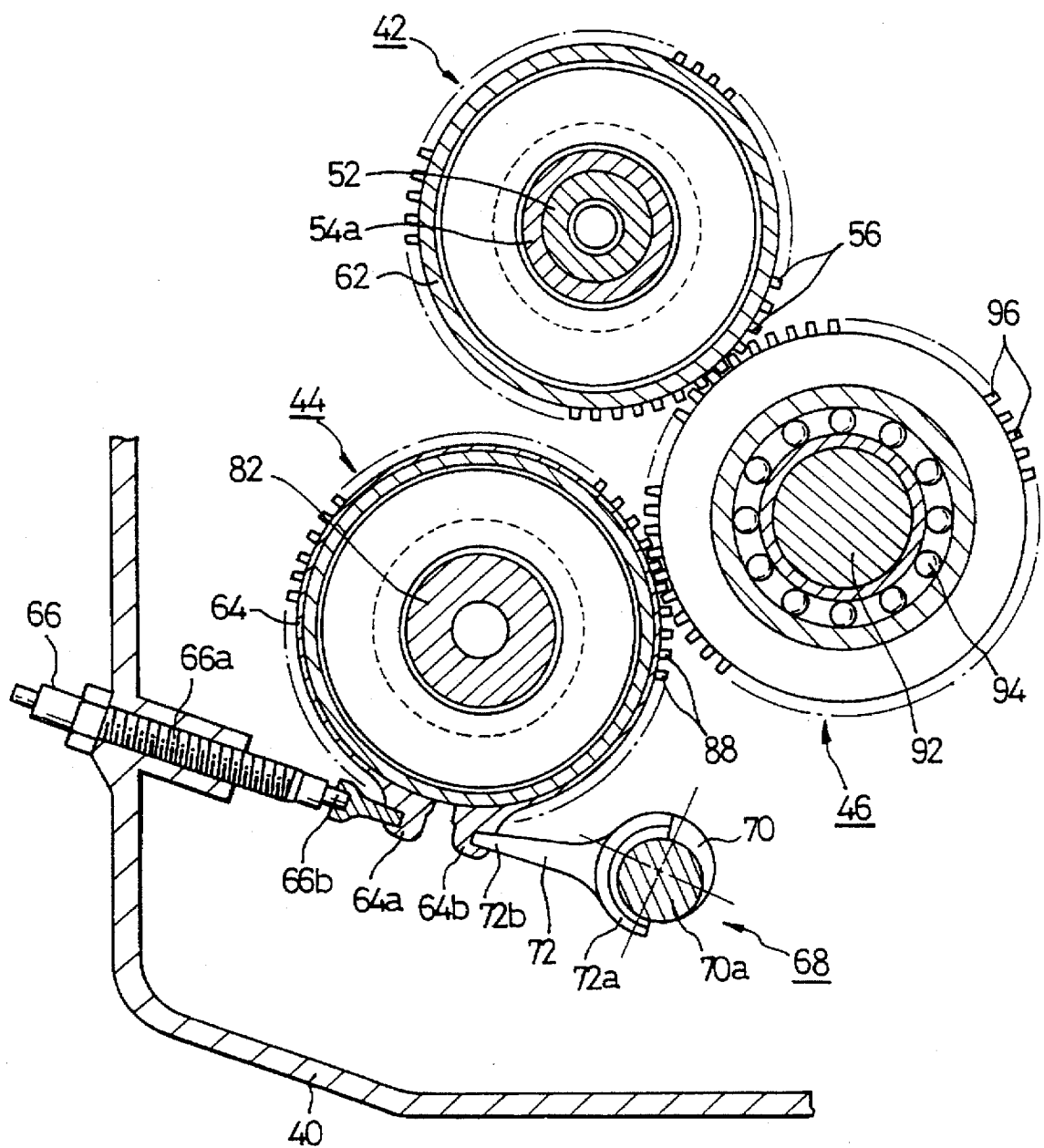
FIG. 5 is a sectional view taken along line V—V in FIG. 4.

FIGS. 4 and 5 illustrate a power shift transmission incorporating a parking brake in accordance with the second embodiment of the invention. The same reference numerals as in the preceding embodiment is used to designate like or same parts in FIGS. 4 and 5. The brake band 64 in the second embodiment is wrapped around the drum 88a that axially projects from the output gear 88 of the idle assembly 44. Moreover, the adjustment bolt 66 and the band actuator 68 are all attached to the lower part of the transmission housing 40. Other construction of the parking brake shown in FIGS. 4 and 5 than noted just above does not differ from that of the preceding embodiment. In operation, if the driver pulls up a parking lever, the cam shaft 70 will rotate clockwise to push the connecting rod 72 in a left-handed direction, causing the brake band 64 to apply a braking force on the drum 88a, Releasing the parking lever will turn the cam shaft 70 counterclockwise to loosen the brake band 64 and thereby remove the braking force out of the drum 88a.

While the invention has been shown and described with reference to a preferred embodiment, it should be apparent to one of ordinary skill that many changes and modifications may be made without departing from the spirit and scope of the invention as defined in the claims.

What is claimed is:

1. A power shift transmission with a parking brake, comprising:

a transmission housing;

an input assembly having an input shaft journalled on said transmission housing, an input gear fixed to the input shaft and an output gear rotatably fitted on the input shaft and selectively couplable to the input gear for unitary rotation therewith, said output gear having an array of teeth provided along an outer circumference thereof and a brake drum extending toward the input gear;

an idle assembly having an idle shaft journalled on said transmission housing in parallel with the input shaft of said input assembly, an input idle gear fixed to the idle shaft and remaining in meshing engagement with the input gear of said input assembly, and an output idle gear rotatably fitted on the idle shaft and selectively couplable to the input idle gear for unitary rotation therewith;

an output assembly having an output shaft in parallel with said input shaft and said idle shaft and a final driven gear fixed to the output shaft and remaining in meshing engagement with the output gear of said input assembly and the output idle gear of said idle assembly;

a brake band wound around the brake drum of the output gear of said input assembly in a side-to-side relationship with the teeth of said output gear; and means for tightening said brake band to prevent rotation of the output gear of said input assembly and thereby the output shaft of said output assembly.

2. The power shift transmission as recited in claim 1, wherein said band tightening means includes a cam shaft rotatably mounted to the transmission housing in parallel with the input shaft of said input assembly, said cam shaft including an eccentric cam having an axis remaining offset from an axis of the cam shaft, and a connecting rod engaging with the eccentric cam at a first end thereof and attached to the brake band at a second end thereof.

3. The power shift transmission as recited in claim 1, further comprising a first hydraulically operated clutch for selectively connecting the output gear to the input gear of said input assembly and a second hydraulically operated clutch for selectively coupling the output idle gear to the input idle gear of said idle assembly.

4. A power shift transmission with a parking brake, comprising:

a transmission housing;

an input assembly having an input shaft journalled on said transmission housing, an input gear fixed to the input shaft and an output gear rotatably fitted on the input shaft and selectively couplable to the input gear for unitary rotation therewith;

an idle assembly having an idle shaft journalled on said transmission housing in parallel with the input shaft of said input assembly, an input idle gear fixed to the idle shaft and remaining in meshing engagement with the input gear of said input assembly, and an output idle gear rotatably fitted on the idle shaft and selectively couplable to the input idle gear for unitary rotation therewith, said output idle gear having an array of teeth provided along an outer circumference thereof and a brake drum extending toward the input idle gear;

an output assembly having an output shaft in parallel with said input shaft and said idle shaft and a final driven gear fixed to the output shaft and remaining in meshing engagement with the output gear of said input assembly and the output idle gear of said idle assembly;

a brake band wound around the brake drum of the output idle gear of said idle assembly in a side-to-side relationship with the teeth of said output idle gear; and means for tightening said brake band to prevent rotation of the output idle gear of said idle assembly and thereby the output shaft of said output assembly.

5. The power shift transmission as recited in claim 4, wherein said band tightening means includes a cam shaft rotatably mounted to said transmission housing in parallel with the input shaft of said input assembly, said cam shaft including an eccentric cam having an axis remaining offset from an axis of the cam shaft, and a connecting rod engaging with the eccentric cam at a first end thereof and attached to the brake band at a second end thereof.

6. The power shift transmission as recited in claim 4, further comprising a first hydraulically operated clutch for selectively connecting the output gear to the input gear of said input assembly and a second hydraulically operated clutch for selectively coupling the output idle gear to the input idle gear of said idle assembly.

* * * * *